United States Patent [19]

Kleiner et al.

[11] 3,884,879

[45] May 20, 1975

[54] PERFLUOROALKYL-THIOETHER ALCOHOLS, ESTERS AND POLYMERS THEREOF

[75] Inventors: Edward Karl Kleiner, New York; Martin Knell, Ossining, both of N.Y.

[73] Assignee: Ciba-Geigy Corporation, Ardsley, N.Y.

[22] Filed: Apr. 30, 1973

[21] Appl. No.: 355,640

Related U.S. Application Data

[60] Division of Ser. No. 299,487, Oct. 20, 1972, Pat. No. 3,763,116, which is a continuation-in-part of Ser. No. 199,793, Nov. 17, 1971, abandoned, which is a continuation-in-part of Ser. No. 720,370, April 10, 1968.

[52] U.S. Cl.............. 260/609 R; 8/115.6; 8/116 R; 260/486 R
[51] Int. Cl............................................ C07c 149/18

[58] Field of Search.................. 260/609 R

[56] References Cited
UNITED STATES PATENTS
3,786,089  1/1974  Rondestvedt................... 260/609 R
FOREIGN PATENTS OR APPLICATIONS
1,594,925  8/1969  Germany........................ 260/609 R

*Primary Examiner*—Elbert L. Roberts
*Assistant Examiner*—D. R. Phillips
*Attorney, Agent, or Firm*—Edward McC. Roberts; Joseph G. Kolodny; Prabodh I. Almaula

[57] ABSTRACT

Perfluoroalkyl group containing thioether alcohols are converted into α,β-Unsaturated mono-, di- and triesters from which polymers are derived having soil repellent properties particularly if applied to substrates such as textiles, paper and leather.

8 Claims, No Drawings

PERFLUOROALKYL-THIOETHER ALCOHOLS, ESTERS AND POLYMERS THEREOF

RELATED APPLICATION

This application is a division of application Ser. No. 299,487, filed Oct. 20, 1972, now U.S. Pat. No. 3,763,1116, which is a continuation-in-part of application Ser. No. 199,793, filed Nov. 17, 1971, now abandoned, which is a continuation-in-part of application Ser. No. 720,370, filed Apr. 10, 1968, now pending.

SUMMARY OF THE INVENTION

This invention relates to improve soil repellent finishes which are based on their property of possessing low free surface energy. The polymers derived from the disclosed compounds provide oil and water repellent finishes useful to treat materials such as textiles, paper, leather, painted wood and metallic surfaces and the like.

More specifically this disclosure relates to novel thioether alcohols which can be converted into $\alpha,\beta$-unsaturated mono-, di- and triesters. Polymers derived from these esters are highly desirable in application as surface finishes to provide a desirable degree of low free surface energy.

The thioether alcohols of this invention contain a perfluoroalkyl group and are of the formula:

I      $R_fC_mH_{2m}SC_nH_{2n}OH$ wherein
M is 2 to 12;
n is 2 to 12;
$R_f$ is $C_pF_{2p+1}OC_qF_{2q}$;
P is 3 to 18, and preferably 6 to 12;
and q is 2 to 8.

In formula I, a most desirable class of alcohols is where p is 6 to 12, m is 2 and n is $(CH_2)_2$ to e.

Compounds not within the scope of the present invention but useful in preparing compounds of formula II described below are compounds of formula I wherein $R_f$ is $C_pF_{2p+1}$ and p is as herein before defined.

The novel monomers derived from the $R_f$-thioether alcohols of type I are, -unsaturated esters having the following structure II:

II

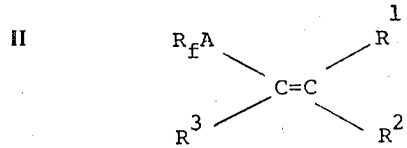

wherein
$R_fA$- is $R_fC_mH_{2m}SC_nH_{2n}O^0C$- where $R_f$ is $C_pF_{2p+1}$ or $C_pF_{2p+1}OC_qF_{2q}$; and
a. $R^1$ and $R^2$ are hydrogen and $R^3$ is hydrogen or methyl when $R_f$ to $C_pF_{2p+1}OC_q F_{2q}$; or
b. $R^1$, $R^2$, $R^3$ are hydrogen, methyl, $R_fA$- or $R_fACH_2$- with the proviso that at least one or two of the R- substituents represent $R_fA$- or $R_fACH_2$. If $R^1$, $R^2$ represent the substituents as defined above, formula II represents the following esters:

| Type Ester | $R^1$ | $R^2$ | $R^3$ |
|---|---|---|---|
| Acrylate | —H | —H | —H |
| Methacrylate | —H | —H | —CH₃ |
| Fumarate | —H | —AR_f | —H |
| Maleate | —AR_f | —H | —H |
| Mesaconate | —H | —AR_f | —CH₃ |
| Citraconate | —AR_f | —H | —CH₃ |
| Itaconate | —H | —H | —CH₂AR_f |
| Methylene malonate | —H | —H | —AR_f |
| cis-Aconitate | —H | —AR_f | —CH₂AR_f |
| trans-Aconitate | —AR_f | —H | —CH₂AR_f |

Note that the acrylate and methacrylate type esters are within the scope of this invention only when $R_f$ is $C_pF_{2p+1}OC_qF_{2q}$ If monomers of type II are homo- or copolymerized, polymers are obtained containing the following repeating units or moieties III.

III

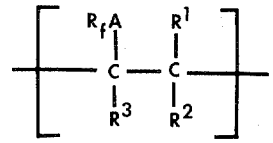

wherein $R_fA$, $R^1$, $R^2$, $R^3$ are as defined above.

DETAILED DESCRIPTION OF THE INVENTION

PERFLUOROALKYLTHIOETHER ALCOHOLS

Several alternative techniques exist for the synthesis of the perfluoroalkylthioether alcohols of the present invention and are of the generic structure:

I      $R_fC_mH_{2m}SC_nH_{2n}OH$

A suitable method for forming this alcohol is by reduction of esters or acids of types IV and V employing conventional reducing agents such as lithium aluminum hydride, diisobutyl aluminum hydride, hydrogen and metal catalysts:

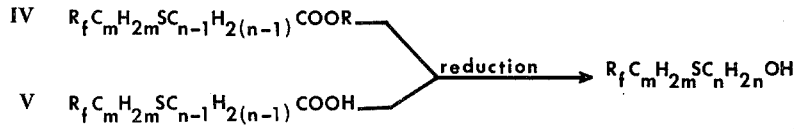

Employing this route of synthesis, the desired $R_f$ thioether alcohols of type Ia are obtained where n is equal or larger than 3, as shown by the following example:

The synthesis of esters and acids of types IV and V is disclosed in U.S. Pat. No. 3,172,910 and they are prepared by the addition of $R_f$-mercaptans of type VI to unsaturated ethers (or acids) of type VII:

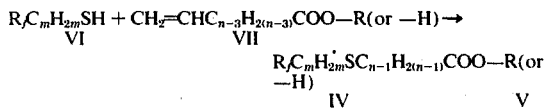

If in esters or acids of type VII the alkylene linkage is zero, as this is the case for acrylic esters or acrylic acid, then esters or acids of types IVa or Va are obtained:

$$R_fC_mH_{2m}SH + CH_2\text{=}CHCOO\text{—}R(\text{or} \text{—}H) \rightarrow R_fC_mH_{2m}SCH_2CH_2COO\text{—}R(\text{or} \text{—}H)$$
$$\text{VI} \quad\quad \text{VII} \quad\quad\quad\quad \text{IV}a/\text{V}a$$

Reduction of esters or acids of type IVa and Va yield $R_f$-thioether alcohols of type Ia, where n is 3, the smallest possible n-number that can be obtained employing the outlined route of synthesis:

$$R_fC_mH_{2m}SCH_2CH_2COO\text{—}R(\text{or—}H) \rightarrow R_fC_mH_{2m}S(CH_2)_nOH, \quad n\text{=}3$$
$$\text{IV}a/\text{V}a \quad\quad\quad\quad\quad \text{I}a$$

Another general technique for formation of the thioether alcohol of type I is by a free radical addition of $R_f$-mercaptans of type VI and unsaturated alcohols of type VIII and preferably a terminally unsaturated alcohol of type VIIIa:

$$R_fC_mH_{2m}SH + C_nH_{2n-1}OH \rightarrow R_fC_mH_{2m}SC_nH_{2n}OH$$
$$\text{VI} \quad\quad \text{VIII} \quad\quad\quad\quad \text{I}$$
$$R_fC_mH_{2m}SH + CH_2\text{=}CHC_{n-2}H_{2(n-2)}OH \rightarrow R_fC_mH_{2m}SC_nH_{2n}OH$$
$$\text{VI} \quad\quad \text{VIII}a \quad\quad\quad\quad \text{I}$$

The free radical catalyzed addition may be undertaken in accordance with the general procedures described in U.S. Pat. No. 3,172,910.

Of special interest are lower, terminally unsaturated alcohols of type VIIIa such as allyl alcohol yielding $R_f$-thioether alcohols of type Ia, $$R_fC_mH_{2m}SH + CH_2\text{=}CHCH_2OH \rightarrow R_fC_mH_{2m}S(CH_2)_nOH$$
$$\text{VI} \quad\quad \text{Allyl alcohol} \quad\quad \text{I}a, n\text{=}3$$

$R_f$-thioether alcohols of type I, where n is 2 cannot be prepared by the above outlined route of synthesis due to the fact that vinyl alcohol, $CH_2\text{=}CH\text{—}OH$, is non-existent.

In order to obtain $R_f$-thioether alcohols of type I, where n is equal to 2, $R_f$-mercaptans of type VI are added to vinyl acetate, employing either a free radical catalyzed reaction system as referred to earlier, or a base catalyzed reaction system as described for the addition of mercaptans to acrylic and methacrylic esters:

$$R_fC_mH_{2m}SH + CH_2\text{=}CHOOCCH_3 \rightarrow R_fC_mH_{2m}S(CH_2)_nOOCCH_3;$$
$$n\text{=}2$$
$$\text{VI} \quad\quad \text{vinyl acetate} \quad\quad \text{IX}$$

The $R_f$-acetate IX can easily be hydrolized to yield $R_f$-thioether alcohols of type Ib, where n is 2:

$$R_fC_mH_{2m}S(CH_2)_nOOCCH_3 \xrightarrow{OH^-}_{hydrolysis} R_fC_mH_{2m}S(CH_2)_nCH; \quad n\text{=}2$$
$$\text{IX}, n\text{=}2 \quad\quad\quad\quad \text{I}b$$

It is, of course, understood that the $R_f$-thioether alcohols of type I, where n is greater than 2 can also be prepared employing esters of types X and Xa instead of the corresponding alcohols of types VIII and VIIIa for the addition reaction with $R_f$-mercaptans:

$$R_fC_mH_{2m}SH + C_nH_{2n-1}OOCR \rightarrow R_fC_mH_{2m}SC_nH_{2n}OOCR$$
$$\text{VI} \quad\quad \text{X} \quad\quad\quad\quad \text{IX}a$$
$$R_fC_mH_{2m}SH + CH_2\text{=}CHC_{n-2}H_{2n-2}OOCR \rightarrow R_fC_mH_{2m}SC_nH_{2n}OOCR$$
$$\text{VI} \quad\quad \text{X}a \quad\quad\quad\quad \text{IX}a$$

Hydrolysis of IXa yields $R_f$-thioether alcohols of type I, as shown above.

A technique for formation of a thioether alcohol disclosed as an intermediate compound and of the formula $C_{10}F_{21}C_2H_4SC_2H_4OH$ has been shown in Blochl, West German Patent 1,594,925 involving reaction of ethylene oxide with a mercaptan of the formula $C_{10}F_{21}C_2H_4SH$.

$R_f$ mercaptans of the formula $R_fC_mH_{2m}SH$ have been disclosed as suitable in formation of the novel perfluoroalkyl thioether alcohols. These mercaptans are described in a number of U.S. patents and other literature publications including U.S. Pat. Nos. 2,894,991; 2,961,470; 2,965,677; 3,088,849; 3,172,910; and 3,544,663.

A most convenient synthesis method was found to be a thiourea method according to the following equation:

$$R_fC_mH_{2m}I + (NH_2)_2C\text{=}S \xrightarrow{C_2H_5OH}$$
$$(R_fC_mH_{2m}SCNH_2)HI \xrightarrow{NaOH} R_fC_mH_{2m}SH$$
$$\quad\quad\quad NH$$
$$\text{XI} \quad\quad\quad\quad\quad\quad \text{VI}$$

The $R_f$ groups as previously defined are of the formula $C_pF_{2p+1}$ or $C_pF_{2p+1}OC_qF_{2q}$ wherein $p$ is 3 to 18 and preferably 6 to 12 and q is 2 to 8. The perfluoroalkyl constituents may be branched or straight chains. The perfluoroalkyl thioether alcohols where $R_f$ is $C_pF_{2p+1}$ are not within the scope of the present invention but are useful in preparing the esters of the present invention hereinbefore described as structure II.

The alkylene linkage groups in Formula I, $C_mH_{2m}$ and $C_nH_{2n}$ have been previously defined wherein m is 2 to 12 and n is 2 to 12 respectively. As disclosed by the techniques of synthesis, both $C_mH_{2m}$ and $C_nH_{2n}$ may be branched or linear. From the standpoing of commercial use, it is considered desirable that $C_nH_{2n}$ as well as $C_mH_{2m}$ are linear. Additionally over the disclosed range of m and n, the respective values may be different or identical.

$R_f$ THIOETHER MONOMERS OF FORMULA II

The monomers derived from the perfluoroalkyl thioether alcohols discussed previously are of the formula:

II

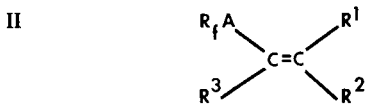

wherein $R_fA$- is $R_fC_mH_{2m}SC_nH_{2n}O\overset{O}{C}$- as defined above and a. $R^1$ and $R^2$ are hydrogen and $R^3$ is hydrogen or methyl when $R_f$ is $C_pF_{2p+1}OC_qF_{2q}$, or b. $R^1$, $R^2$, $R^3$ are hydrogen, methyl $R_fA$- or $R_fACH_2$- with the proviso that at least one or two of the R-substituents represent $R_fA$- or $R_fACH_2$-.

These compounds may be prepared following procedures familiar to those skilled in the art. With the exception of the perfluoroalkyl thioether alcohols, the starting materials are generally commercially available and/or may be prepared in accordance with well known techniques.

The ester monomers of Formula II are obtained from the perfluoroalkyl thioether alcohols and acrylic, methacrylic, fumaric, maleic, mesaconic, citraconic itaconic methylene malonic or aconitic acids, and acid chlorides or acid anhydrides if obtainable and esters of these acids by well known esterification or transesterification techniques.

Since many of the starting acids have high melting points or poor solubility characteristics, it is usually preferable to employ the acid chlorides, anhydrides or lower alkyl esters of the listed acids.

Instead of employing the perfluoroalkyl thioether as a reactant material, it is also possible and often advantageous to employ esters of the formula $R_fC_mH_{2m}SC_nH_{2n}OOCP$ wherein R is lower alkyl of 1 to 6 carbon atoms. The following equations illustrate the reaction of perfluoroalkyl thioester of Formula I, $R_fC_mH_{2m}SC_nH_{2n}OH$ and from specific esters of the formula $R_fC_mH_{2m}SC_nH_{2n}OOCR$:

1 + CH₂=C(CH₃)COOH ⟶ 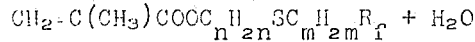 + H₂O

2 I + 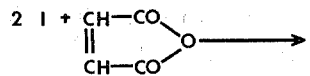 ⟶ 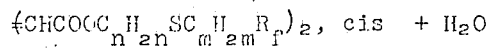, cis + H₂O

2 I + (=CHCOO₂H₅)₂, trans ⟶ 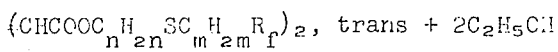, trans + 2C₂H₅OH

2 I + CH₂=C(COCl)CH₂COCl ⟶ 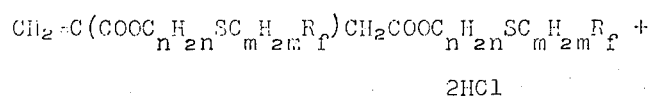
2HCl

2 IX + (=CHCOOH₃)₂, trans ⟶ 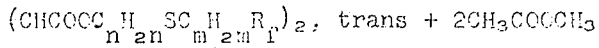, trans + 2CH₃COOCH₃

POLYMERIZATION OF PERFLUOROALKYL THIOETHER MONOMERS

Polymers possessing soil repellent properties may be formed from $R_f$ thioether monomers of Formula II, II 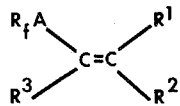

wherein $R_fA$, $R^1$, $R^2$, and $R^3$ have been previously defined.

Both homo- and copolymers may be formed utilizing the formula II reactant to form a constituent of the polymer chain. The polymers contemplated by this invention include, homopolymers, copolymers with other ethylenically unsaturated monomers, and physical blends of such homopolymers and copolymers together and/or with other polymers.

The polymers and copolymers derived from the thioether monomers will have units in the polymeric chain of the formula:

III 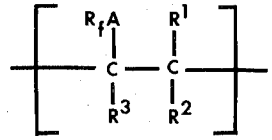

The formula II $R_f$thioether monomers and polymers derived therefrom can be considered to be divided into two distinct classes due to their polymerization behavior. This separate distinction is based on the structure characteristics based on the numbers of $R_f$ group per monomeric moiety in the polymer chain. These two classes are based on polymers derived from acrylates and methacrylates on one hand, as opposed to fumarates, maleates, mesaconates, citraconates, itaconates, methylene malonates, and aconitates on the other hand. Polymers derived from acrylates and methacrylates are within the scope of this invention only when the $R_f$ substituent on the monomer is $C_pF_{2p+1}OC_qF_{2q}$.

Turning to the first class which are acrylates and methacrylates, the polymerization will proceed as follows:

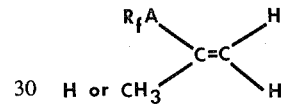

polymerization ⟶ 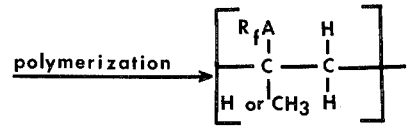

The acrylate and methacrylate monomers are highly reactive and have a great tendency to form both homo- or copolymers. The polymer chain with the $R_f$ group from the acrylate or methacrylate contains one $R_f$ group per monomer moiety. In a homopolymer derived from the novel $R_f$ acrylate or methacrylate monomers, the ratio of $R_f$ groups to polymer backbone carbon atoms is 1 to 2. If a comonomer is employed the ratio is 1 to greater than 2, as for example 1 to 4 when 1 mole of $R_f$ acrylate or methacrylate is copolymerized with one mole of a comonomer. In the formation of copolymers, the acrylate and methacrylate monomers are highly reactive and form random copolymers.

The polymerization of the $R_f$-acrylate and $R_f$-methacrylate monomers of type IIa is analogous to the polymerization of acrylate and methacrylate monomers, as described in Houben-Weyl, Methoden der Organischen Chemie, Vol. 14/1, p. 1033–1047, (Georg Thieme Verlag, Stuttgart, 1961) or C.E. Schildknecht, Vinyl and Related Polymers, p. 179–255 (John Wiley and Sons, Inc., New York 1952).

In contrast the second group of polymers derived from $R_f$ fumarates, maleates, mesaconates, citraconates, itaconates and aaconitates show a lower tendency toward homopolymerization and form low-molecular weight homopolymers, also called oligomers. They show however a great tendency to form alternating copolymers with certain types of comonomers as outlined later. In a homopolymer or an alternating copolymer derived from the novel $R_f$-fumarates and other novel $R_f$-di and triesters, the $R_f$-groups are present in the polymer chain always as either close-packed pairs or triplets of $R_f$-groups and the ratio of $R_f$-groups to polymer backbone carbon is illustratively in a $R_f$-fumarate homopolymer, 1 to 1 or 1 to 2 in an alternating copolymer thereof. The fact that in homopolymers as well as in copolymers of the novel $R_f$-di and triesters, the $R_f$-groups are always present as close packed pairs or triplets is most important since this close packing yields higher oil repellency ratings.

The following reactions illustrate this closeness of packing of $R_f$ groups in the novel di- and triesters:

Although the ease of polymerization will differ between the acrylate and methacrylate type monomers on one hand and the fumarate and related monomers on the other, similar conditions may be employed to obtain the desired polymerization.

Generally polymerization may be carried out in bulk, solution, suspension or emulsion. Solution and emulsion polymerizations are preferred.

In emulsion polymerization, the monomer or monomers to be polymerized are emulsified together in a water solution of a surface active agent to a given monomer concentration of from about 5 to about 50

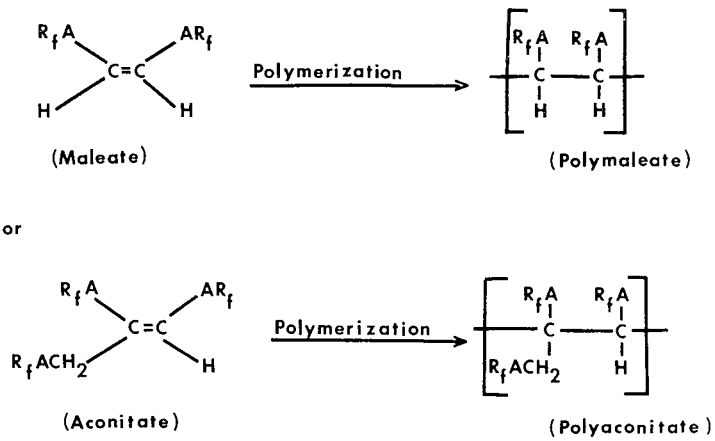

In copolymers this closeness of packing of the $R_f$ group remains in the fumarate and related monomer moiety.

Of the two classes of polymers derived from the acrylate and methacrylates as opposed to the fumarates and related compounds, certain advantages relate to each group in comparison with the other.

Polymers including alternating copolymers derived from fumarates and related compounds tend to show very low free surface energies and excellent oil repellency ratings due to the fact that closely packed pairs or triplets of $R_f$ groups are present in the polymer chain.

$R_f$-fumarates and related di- and triester monomers can also be utilized for the synthesis of graft polymers due to the fact that they show a reduced tendency to homopolymerize but an increased tendency toward grafting reactions if compared with the $R_f$ acrylates and methacrylates.

In contrast the $R_f$-acrylates and methacrylates contain just one instead of two or more of the heavy $R_f$ groups and possess approximately one half to a third of the molecular weight of analogous fumarates and related monomers. Due to the lower molecular weights of the acrylate and methacrylate monomers have a) lower boiling points so that purification via distillation is much easier and b) lower melting points and better solubility properties, a factor most helpful in emulsion polymerization.

Thus it is considered generally from the standpoint of soil repellency the fumarates and related compounds are more highly desirable particularly in forming copolymers but the acrylate and methacrylates do possess good soil repellency qualities in the form of homopolymers and can be desirable for the reasons discussed above.

percent. Usually the temperature is raised to between 40°C and 70°C to effect polymerization in the presence of an added catalyst. A suitable catalyst may be any one of the commonly known agents for initiating the polymerization of an ethylenically unsaturated compound. The concentration of the catalyst for the polymerization is usually between 0.1 and 2 percent based upon the weight of the monomers.

Suitable surfactants or emulsifying agents include cationic, anionic or non-ionic types. Since the cationic and non-ionic types can be used in most textile treating baths, they are preferred. The hydrophobic portion of the surfactant may be hydrocarbon or fluorinated hydrocarbon.

Suitable surfactants that may be used include, for example, non-ionic surfactants in which the hydrophilic group is a poly(ethoxy) group and the hydrophobic portion is either a hydrocarbon or a fluorocarbon group such as the ethylene oxide condensates of alkyl phenols, alkanols, alkylamines, alkyl thiols, alkylcarboxylic acids, fluoroalkyl carboxylic acids, fluoroalkyl amides and the like.

Suitable cationic surfactants include for example quaternary ammonium salts or amine salts containing at least one long chain alkyl, fluoroalkyl, or high alkyl substituted benzene or naphthalene group to provide the hydrophobic portion.

Polymerization is preferably carried out for a reaction period adjusted to obtain essentially quantitative conversion of the fluorinated monomer. The optimum reaction time will depend upon the catalyst used and the polymerization temperature and other conditions, but will generally be in the range of from 0.5 to 24 hours.

The polymerization temperature will depend upon the catalyst chosen. In the case of emulsion polymerization in aqueous media, it will generally be in the range of from 20° to 90°C. The polymerization is generally most conveniently and preferably carried out at atmospheric pressure wherever possible.

In solution polymerization, the monomer or monomers are dissolved in a suitable solvent such as fluorinated solvents, for example, hexafluoroxylene, trifluorotoluene or mixtures thereof with acetone and/or ethylacetate and polymerized in a reaction vessel using initiators such as azobisisobutyronitrile or other azo initiators at concentrations of 0.1 to 2.0 percent at 40° – 100°C under nitrogen.

As mentioned, besides homopolymers, valuable copolymers are obtained by polymerization of the foregoing novel perfluorinated monomers with other polymerizable monomers having ethylene unsaturation.

The following types of comonomers are useful in the preparation of copolymers of the novel $R_f$-monomers of type II:

ethylene and chloro, fluoro- and cyano- derivatives of ethylene such as vinyl chloride, vinylidene chloride, vinyl fluoride, vinylidene fluoride, acrylonitrile, methacrylonitrile, tetrafluoroethylene, trifluorochloroethylene, hexafluoropropylene; acrylate and methacrylate monomers, particularly those with 1 to 12 or 18 carbon atoms in the ester groups such as n-propyl methacrylate, 2-methyl cyclohexyl methacrylate, methyl methacrylate, t-butyl methacrylate, n-butyl methacrylate, methyl acrylate, ethyl acrylate, propyl acrylate, butyl acrylate, 3-methyl-1-pentyl acrylate, octyl acrylate, tetradecyl acrylate, s-butyl acrylate, 2-ethylhexyl acrylate, 2-methoxyethyl acrylate, and phenyl acrylate; dienes particularly 1, 3-butadiene, isoprene, and chloroprene, 2-fluoro-butadiene, 1,1,3-trifluorobutadiene, 1,1,2,3-tetrafluoro butadiene, 1,1,-2-trifluoro-3,4-dichlorobutadiene and tri- and pentafluoro butadiene and isoprene; nitrogen-vinyl monomers such as vinyl pyridine, N-vinylimides, amides, vinyl succinimide, vinyl pyrrolidone, N-vinyl carbazole and the like;

styrene and related monomers which copolymerize readily with the novel esters of this invention such as o-methylstyrene, p-methylstyrene, 3,4-dimethyl styrene, 2, 4,6-trimethyl styrene, m-ethyl styrene, 2,5-diethyl styrene;

vinyl esters, e.g., vinyl acetate, vinyl esters of substituted acids, such as for example, vinyl methoxyacetate, vinyl trimethylacetate, vinyl isobutyrate, isopropenyl butyrate, vinyl lactate, vinyl caprylate, vinyl pelargonate, vinyl myristate, vinyl oleate and vinyl linoleate; vinyl esters of aromatic acids, such as vinyl benzoate;

alkyl vinylethers, such as methyl vinyl ether, isopropyl vinyl ether, isobutyl vinyl ether, 2-methoxy ethyl vinyl ether, n-propyl vinyl ether, t-butyl vinyl ether, isoamyl vinyl ether, n-hexyl vinyl ether, 2-ethylbutyl vinyl ether, diisopropylmethyl vinyl ether, 1-methyl-heptyl vinyl ether, n-decyl vinyl ether, n-tetradecyl vinyl ether, and n-octadecyl vinyl ether.

Propylene, butylene and isobutylene are preferred α-olefins useful as comonomers with the novel fluoro monomers of the present invention with straight and branched chain α-olefins useful with up to 18 carbon atoms in the side chain.

Also useful as comonomers with some of the novel monomers of the present invention are vinyl monomers which contain perfluorinated side chains. Examples of such perfluorinated monomers are vinyl ethers of the type disclosed in U.S. Pat. No. 2,732,370 and U.S. Pat. No. 2,828,025; vinyl esters containing fluorinated alkyl groups disclosed in U.S. Pat. No. 2,592,069 and U.S. Pat. No. 2,436,144. Other useful monomers are acrylates and methacrylates and derivatives thereof such as those disclosed in U.S. Pat. No. 2,628,958; U.S. Pat. No. 3,256,230; U.S. Pat. No. 2,839,513; U.S. Pat. No. 3,282,905; U.S. Pat. No. 3,252,932; and U.S. Pat. No. 3,304,278.

Other $R_f$ groups containing monomers useful for copolymerization are fumarates, maleates, itaconates, and other α, β-unsaturated di- and triesters as described in the co-pending application FCR 27 and the following applications assigned to the assignee of the present invention:

Ser. No. 720,370, filed Apr. 10, 1968, in the names of Eduard K. Kleiner and Martin Knell; Ser. No. 732,040, filed May 27, 1968, in the names of Eduard K. Kleiner, Martin Knell and Pier Luigi Pacini; Ser. No. 812,439, filed Apr. 1, 1969, in the name of Eduard K. Kleiner; Ser. No. 820,647, filed Apr. 30, 1969, in the name of Eduard K. Kleiner; and Ser. No. 833,706, filed June 16, 1969, in the names of Eduard K. Kleiner and Pier Luigi Pacini.

Of the listed comonomers, the acrylate and methacrylate monomers are the most important comonomers for the novel $R_f$-acrylates and $R_f$-methacrylates, whereas vinyl ethers, vinyl esters, styrenes and α-olefins are the most important comonomers for the novel $R_f$-fumarates and related di- and triesters due to the fact that they form 1:1 alternating copolymers.

As mentioned, it may also be desirable to include a minor amount of other reactive comonomers in order to improve the wash and dry-clean properties of the novel textile finishes obtained according to the practice of this invention. Such monomers act as cross-linking agents during the curing operation. Such reactive comonomers are generally employed in amounts of 0.1 to 2 percent.

Reactive monomers which may be included are by way of illustration: acrylic acid, methacrylic acid, acrylamide, methacrylamide, N-methylolacrylamide, 2-hydroxyethyl methacrylate or acrylate, hydroxypropyl acrylates or methacrylates, and t-butylaminoethyl methacrylate, and glycidyl methacrylate. Of the foregoing, N-methylolacrylamide and 2-hydroxyethyl methacrylate are preferred.

Coatings of the homopolymers and copolymers according to the present invention can be prepared and applied from solvent solutions or from aqueous emulsions. Suitable solvents are fluoroalkanes, fluorochloroalkanes, fluoroalkyl substituted aromatics, alkyl esters of perfluoroalkanoic acids, chlorinated alkanes or aromatics, hydrocarbon aromatics, ketones, esters and ethers. Especially useful as solvents are the fluorinated liquids, and especially α,α,α-trifluorotoluene, otherwise known as benzotrifluoride, hexafluoroxylene and mixtures of these with ethyl acetate or acetone and the like. Concentrations of the fluorinated polymers of the present invention in solvent to provide coatings with effective oil and water repellency properties will generally be of the order ofo 0.01 to 10 percent and preferably from 0.1 to 2.0 percent by weight. Blends of the emulsions of the polymers of this invention with blended emulsions of other polymers and copolymers are particularly useful in textile finishes. The polymers and copolymers are generally of a non-fluorinated type; however, as indicated below other fluorinated polymers and copolymers may be used if desired. Non-fluorinated polymers useful in such blends, include for example, but without limitation, polymers and copolymers of alkyl acrylates and alkyl methacrylates, such as methyl methacrylate, ethyl methacrylate, hexyl methacrylate, and n-octyl methacrylate. A particularly suitable polymer is poly-n-octyl methacrylate. Also useful are polymers and copolymers of acrylic acid, methacrylic acid, styrene, alkyl styrene, butadiene, 2-methyl-1,3-butadiene, 2-chloro-1,3-butadiene; polymers and copolymers of vinyl esters such as vinyl acetate, vinyl butyrate, vinyl laurate, vinyl stearate, vinyl 2-ethyl-hexanoate; polymers and copolymers of vinyl halides and vinylidene halides, such as vinyl chloride, vinylidene chloride, vinyl fluoride, vinylidene fluoride; polymers and copolymers of allyl esters such as allyl propionate, or allyl caprylate; polymers and copolymers of vinyl ketones, such as vinyl methyl ketone, vinyl ethyl ketone, and the like; polymers and copolymers of vinyl ethers such as methyl vinyl ether, cetyl vinyl ether, and the like; polymers and copolymers of acrylamide, methacrylamide, N-methylol acrylamide, N-methylol methacrylamide, N-isopropyl acrylamide, and acrylonitrile and methacrylonitrile.

The polymers of this disclosure possess desirable soil

As outlined in Table 1, iodides of the type $(CF_3)_2CFO(CF_2CF_2)_n$—$CH_2CH_2I$ (prepared as described in U.S. Pat. application Ser. No. 159,514) were converted into the corresponding mercaptans of the type $(CF_3)_2CFO(CF_2CF_2)_n CH_2CH_2SH$ via the thiourea-method (U.S. Pat. No. 3,172,910) and reacted with allyl alcohol, using the procedure as described in Example 1a of copending Parent application, Ser. No. 199,793, to yield $R_f$-thioether alcohols of the type $(CF_3)_2CFO(CF_2CF_2)_nCH_2CH_2SCH_2CH_2CH_2OH$.

EXAMPLE 4 – 9

As outlined in Table 1, mercaptans of the type $(CF_3)_2CFO(CF_2CF_2)_nCH_2CH_2SH$ are added to vinyl acetate employing conditions and catalyst as described in Example 1a of copending Parent application, Ser. No. 199,793. The resulting acetates of the type $(CF_3)_2CFO(CF_2CF_2)_nCH_2CH_2SCH_2$—$CH_2OOCCH_3$ can be used directly for the synthesis of $R_f$-thioether monomers of type II employing transesterification techniques. Hydrolysis of the novel acetates yields $R_f$-thioether alcohols of the type $(CF_3)_2CFO(CF_2CF_2)_nCH_2CH_2SCH_2CH_2OH$.

TABLE 1

| Example No. | $R_f$-iodides and mercaptans | $R_f$-mercaptans and acetates | $R_f$-thioether alcohols |
|---|---|---|---|
| 4 | $(CF_3)_2CFOCF_2CF_2CH_2CH_2I \rightarrow$ | $(CF_3)_2CFOCF_2CF_2CH_2CH_2SH \rightarrow$ | $(CF_3)_2CFOCF_2CF_2CH_2CH_2SCH_2CH_2CH_2OH$ |
| 5 | $(CF_3)_2CFO(CF_2CF_2)_2CH_2CH_2I \rightarrow$ | $(CF_3)_2CFO(CF_2CF_2)_2CH_2CH_2SH \rightarrow$ | $(CF_3)_2CFO(CF_2CF_2)_2CH_2CH_2SCH_2CH_2CH_2OH$ |
| 6 | $(CF_3)_2CFO(CF_2CF_2)_3CH_2CH_2I \rightarrow$ | $(CF_3)_2CFO(CF_2CF_2)_3CH_2CH_2SH \rightarrow$ | $(CF_3)_2CFO(CF_2CF_2)_3CH_2CH_2SCH_2CH_2CH_2OH$ |
| 7 | $(CF_3)_2CFOCF_2CF_2CH_2CH_2SH \rightarrow$ | $(CF_3)_2CFOCF_2CF_2CH_2CH_2SCH_2CH_2OOCCH_3 \rightarrow$ | $(CF_3)_2CFOCF_2CF_2CH_2CH_2SCH_2CH_2OH$ |
| 8 | $(CF_3)_2CFO(CF_2CF_2)_2CH_2CH_2SH \rightarrow$ | $(CF_3)_2CFO(CF_2CF_2)_2CH_2CH_2SCH_2CH_2OOCCH_3 \rightarrow$ | $(CF_3)_2CFO(CF_2CF_2)_2CH_2CH_2SCH_2CH_2OH$ |
| 9 | $(CF_3)_2CFO(CF_2CF_2)_3CH_2CH_2SH \rightarrow$ | $(CF_3)_2CFO(CF_2CF_2)_3CH_2CH_2SCH_2CH_2OOCCH_3 \rightarrow$ | $(CF_3)_2CFO(CF_2CF_2)_2CH_2CH_2SCH_2CH_2OH$ | repellency properties. A useful manner of measuring the relative ratings of the polymers is by oil and water repellency ratings. In the examples the following test procedures were used:

The AATCC Oil Rating was determined according to Standard Test Method 118–1966 T of the American Association of Textile Chemists and Colorists. Ratings are given from 0 (minimum) to 8 (maximum). A commonly accepted level on soil repellency fabrics in the U.S. is an oil repellency of 4.

Another oil repellency method is the 3-M Oil Test procedure of Grajek and Peterson, Textile Research Journal, April 1962, p. 323.

The AATCC water spray test rating was determined according to Standard Test method 22-1966 of the American Association of Textile Chemists and Colorists XXXVII, 1961, p. 1952 (also designated ASTM-D-583-58). Ratings are given from 0 (minimum) to 100 (maximum).

The polymers in the examples were applied to polyester or polyester-cotton (65 percent/35 percent). The polymers were applied to yield a concentration of 0.08 and 0.12 percent fluorine based on the weight of the fabric.

To further illustrate the novel aspects of this invention relating to the novel thioether alcohols of type I, the α, β-unsaturated mono, di- and triesters of type II, and the polymers of type III, the following examples are provided:

EXAMPLES 1 – 3

$R_f$-thiether alcohols of the type $(CF_3)_2CFO(CF_2CF_2)_nCH_2CH_2SCH_2$-$CH_2CH_2OH$, wherein $n = 1, 2$ or $3$

EXAMPLE 10

Bis(6-perfluorooctyl-4-thiahex-1-yl) fumarate, $CHCOOCH_2CH_2$—$CH_2SCH_2CH_2C_8F_{17}]_2$ 6-Perfluorooctyl-4-thiahexan-1-ol (20.0g, 0.0372 mole, example 1), spectrograde toluene (80g) and fumaryl chloride (2.84g, 0.0186 mole, distilled) were refluxed for 18 hours at which time an IR spectrum showed the disappearance of alcohol. On cooling, the product precipitated and was then isolated by filtration. The white precipitate was recrystallized from benzene. 16.6g of white powder (mp 81°–83°C) was obtained (77 percent yield). The NMR showed proton resonances at δ2.02, 4 protons in a multiplet, $2X(COOCH_2\underline{CH_2}CH_2$—$)$; δ2.2–3.0, 12 protons in overlapping multiplets, $2X(COOCH_2CH_2\underline{CH_2}S)$ and $2X(SCH_2CH_2CF_2)$; δ4.33, 4 protons in a triplet, $2X(COO\underline{CH_2}CH_2)$; δ6.85, 2 protons in a singlet, $\underline{CH}=\underline{CH}$. These data are consistent with the above structure.

Analysis for $C_{30}H_{22}F_{34}O_4S_2$:
  Calc.: C, 31.15; H, 1.92; F, 55.85
  Found: C, 31.33; H, 1.96; F, 56.86

EXAMPLE 11

Bis(6-perfluorooctyl-4-thiahex-1-yl) itaconate, $CH_2=C(COOCH_2$—$CH_2CH_2SCH_2CH_2C_8F_{17})CH_2COOCH_2CH_2CH_2SCH_2CH_2C_8F_{17}$ 6-Perfluorooctyl-4-thiahexan-1-1 (20.0g, 0.0372 mole, example 1), spectrograde toluene (80g) and itaconyl chloride (3.11g, 0.0186 mole, distilled) were refluxed, for 22 hours at which time a VPC analysis showed complete reaction. The toluene was evaporated from the reaction mixture and the residue was redissolved in chloroform and then was passed through a column of aluminum oxide (neutral activity I). The product was worked from the column with 500 ml of chloroform which was then stripped off in a rotary film evaporator. The solid residue was crystallized from hexane and 6.8g of white crystals were obtained (mp 68°–69°C, 31 percent yield). The NMR showed proton resonances at δ1.65–2.4, 4 protons in multiplets, 2X(COOCH$_2$CH$_2$CH$_2$S); δ2.3–3.0. 12 protons in complex overlapping multiplets, 2X(CH$_2$CH$_2$SCH$_2$CH$_2$CF$_2$); δ3.32, 2 protons in a singlet, C(COO—)CH$_2$COO; δ4.1–4.5, 4 protons in overlapping triplets, —COOCH$_2$CH$_2$ and CH$_2$COOCH$_2$CH$_2$; δ5.71 and δ6.32, 2 protons in singlets

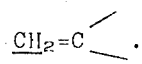

These data are consistent with the above structure.

Analysis for C$_{31}$H$_{24}$F$_{34}$O$_4$S$_2$:
    Calc.: C, 31.80; H, 2.07; F, 55.18; S, 5.48
    Found: C, 31.94; H, 2.09; F, 54.90; S, 6.79 showed a complete reaction. The reaction mixture was cooled and the solvent was stripped off in a rotary film evaporator. The residue was crystallized 2 times from hexane yielding 12.4g of white flakes with an mp 51°–52°C (72 percent yield). The NMR showed proton resonances at δ2.05, 4 protons in a multiplet, 2X(COOCH$_2$CH$_2$CH$_2$S; δ2.15–3.0, 8 protons in overlapping multiplets, 2X(COOCH$_2$CH$_2$CH$_2$SCH$_2$CF$_2$); δ4.32, 4 protons in a triplet, 2X(COOCH$_2$CH$_2$CH$_2$S—); δ6.85, 2 protons in a singlet, CH=CH. These data are consistent for the above structure.

Analysis for C$_{26}$H$_{22}$F$_{26}$O$_2$S$_2$:
    Calc.: C, 32.64; H, 2.32; F, 51.64
    Found: C, 32.69; H, 2.41; F, 52.10

EXAMPLE 13 – 16

Monomers of type II derived from 6-Perfluoroalkyl-4-thiahexan-1-OL

Employing a transesterification procedure (as described in Example 17 of copending Parent application Ser. No. 199,793 fumarates, maleates, itaconates and trans-aconitates were prepared from 6-perfluoroalkyl-4-thiahexan-1-ol (preparation may be found in example 3 of parent application Ser. No. 199,793) and the methyl esters of acrylic, methacrylic, fumaric, maleic, itaconic and trans-aconitic acid as shown in table 2.

TABLE 2

| Example No. | R$_f$-thioether alcohols + of type I | α,β-unsaturated esters | Monomers of Type II |
|---|---|---|---|
| 13 | 2 " + | (=CHCOOCH$_3$)$_2$, trans | (—CHCOOCH$_2$CH$_2$SCH$_2$CH$_2$R$_f$)$_2$, trans |
| 14 | 2 " + | (=CHCOOCH$_3$)$_2$, cis | (=CHCOOCH$_2$CH$_2$CH$_2$SCH$_2$CH$_2$R$_f$)$_2$, cis |
| 15 | 2 " + | CH$_2$=C(COOCH$_3$)CH$_2$COOCH$_3$ | CH$_2$=C(COOCH$_2$CH$_2$CH$_2$SCH$_2$CH$_2$R$_f$)CH$_2$COOCH$_2$CH$_2$CH$_2$SCH$_2$CH$_2$R$_f$ |
| 16 | 3 " | H$_3$COOC\\C=C/COOCH$_3$ / H$_3$COOCCH$_2$ \\H | R$_f$CH$_2$CH$_2$S(CH$_2$)$_3$OOC\\C=C/COO(CH$_2$)$_3$SCH$_2$CH$_2$R$_f$ / R$_f$CH$_2$CH$_2$S(CH$_2$)$_3$OOCCH$_2$ \\H |

EXAMPLE 12

Bis(6-perfluorohexyl-4-thiahex-1-yl) fumarate, =CHCOOCH$_2$CH$_2$—CH$_2$SCH$_2$CH$_2$C$_6$F$_{13}$]$_2$ 6-Perfluorohexyl-4-thiahexan-1-ol, (16.0g, 0.036 mole, example 2), spectrograde toluene (70g) and fumaryl chloride (2.75g, 0.018 mole, distilled) were refluxed for 20 hours at which time a VPC analysis

EXAMPLES 17–20

Monomers of type II derived from R$_f$-thioether acetates

Employing a transesterification procedure, monomers of type II as listed in Table 3 were prepared from the listed R$_f$-thioether acetates and the methyl esters of fumaric, maleic and itaconic acid.

TABLE 3

| Example No. | R$_f$-thioether acetates + | α,β-unsaturated esters | Monomers of Type II |
|---|---|---|---|
| 17 | 2 C$_8$F$_{17}$CH$_2$CH$_2$SCH$_2$CH$_2$COCCH$_3$+ Prepared as in Example 10 of Parent Application Ser. No. 199,793 | (=CHCOOCH$_3$)$_2$, cis | (=CHCOOCH$_2$CH$_2$SCH$_2$CH$_2$C$_8$F$_{17}$)$_2$, cis+2CH$_3$COOCH$_3$ |
| 18 | 2 C$_8$F$_{13}$CH$_2$CH$_2$SCH$_2$CH$_2$OOCCH$_3$+ Prepared as Example 11 of Parent Application Ser. No. 199,793 | (=CHCOOCH$_3$)$_2$, trans | (=CHCOOCH$_2$CH$_2$SCH$_2$CH$_2$C$_6$F$_{13}$)$_2$, trans+2CH$_3$COOCH$_3$ |
| 19 | 2(CF$_3$)$_2$CFOCF$_2$CF$_2$CH$_2$CH$_2$SCH$_2$CH$_2$OOCCH$_3$+ Prepared as in Example 13 of Parent Application Ser. No. 199,793 | CH$_2$=C(COOCH$_3$)CH$_2$COOCH$_3$ | CH$_2$=C(COOCH$_2$CH$_2$SCH$_2$CH$_2$CF$_2$OCF(CF$_3$)$_2$+2CH$_3$COOCH$_3$ CH$_2$COOCH$_2$CH$_2$SCH$_2$CH$_2$CF$_2$OCF(CF$_3$)$_2$ |
| 20 | 2(CF$_3$)$_2$CFO(CF$_2$CF$_2$)$_2$CH$_2$CH$_2$SCH$_2$CH$_2$OOCCH$_3$+ Prepared as in Example 14 of Parent Application Ser. No. 199,793 | (-CHCOOCH$_3$)$_2$, trans | ]-CHCOOCH$_2$CH$_2$SCH$_2$CH$_2$(CF$_2$CF$_2$)$_2$OCF(CF$_3$)$_2$]$_2$ + 2CH$_3$COOCH$_3$ |

EXAMPLES 21 – 30

Ten parts of monomer mixtures of equimolar amounts of novel $R_f$-fumarate or itaconate monomers and comonomers as listed in Table 6, 0.05 parts of azobisisobutyronitrile and 10 parts of hexafluoroxylene were sealed in an ampul under nitrogen and polymerized for 16 hours at 70°C. The resulting polymer solutions were diluted with 30 parts of hexafluoroxylene and added dropwise into 800 parts of methanol under vigorous stirring. The precipitated copolymers were separated by filtration from the solvent-nonsolvent mixture and dried under high-vacuum at room temperature for 48 hours. Yields, appearance and fluorine analysis of the novel copolymers are listed in Table 4.

TABLE 4

| Example No. | Composition of Monomer Mixture (Equimolar Ratio of $R_f$-monomer to Comonomer) | | Appearance of Copolymer | Yield after ppt. | Calc. Found | Elemental Analysis | | |
|---|---|---|---|---|---|---|---|---|
| | $R_f$-Monomer | Comonomer | | | | C | H | F |
| 21 | Fumarate of $C_8F_{17}(CH_2)_2S(CH_2)_3OH$ Ex. 10 | $CH_2=CHO(CH_2)_4OH$ Hydroxybutyl Vinyl Ether | White Soft Polymer | 88.4% | Calc. Found | 33.97 33.73 | 2.69 2.49 | 50.76 50.40 |
| 22 | as above | $CH=CHOCH_3$ Methyl Vinyl Ether | White Powder | 90.5% | Calc. Found | 32.68 32.70 | 2.33 2.26 | 53.11 53.21 |
| 23 | as above | $CH_2=CHC_6H_5$ Styrene | White Powder | 86.3% | Calc. Found | 36.20 36.28 | 2.40 2.66 | 51.02 53.02 |
| 24 | Itaconate of $C_8F_{17}(CH_2)_2S(CH_2)_3OH$ Ex. 11 | $CH_2=CHO(CH_2)_4OH$ Hydroxybutyl Vinyl Ether | White Soft Polymer | 87.3% | Calc. Found | 34.53 33.53 | 2.82 2.58 | 50.20 51.72 |
| 25 | as above | $CH_2=CHOCH_3$ Methyl Vinyl Ether | White Powder | 90.0% | Calc. Found | 33.23 32.27 | 2.46 2.29 | 52.58 54.04 |
| 26 | as above | $CH_2=CHC_6H_5$ Styrene | White Powder | 89.05% | Calc. Found | 36.74 36.95 | 2.53 2.78 | 50.68 52.86 |
| 27 | Fumarate of $C_6F_{13}(CH_2)_2S(CH_2)_3OH$, Ex. 12 | $CH_2=CHOCH_3$ Methyl Vinyl Ether | White Soft Polymer | 99.4% | Calc. Found | 34.33 34.28 | 2.78 2.62 | 48.69 49.69 |
| 28 | as above | $CH_2=CHO(CH_2)_4OH$ Hydroxybutyl Vinyl Ether | White Soft Polymer | 77.6% | Calc. Found | 35.83 35.23 | 3.19 2.99 | 46.05 49.12 |
| 29 | as above | $CH_2=CHC_6H_5$ Styrene | White Soft Polymer | 76.4% | Calc. Found | 38.50 39.42 | 2.85 3.01 | 46.57 48.55 |
| 30 | as above | $CH_2=CHOCOCH_3$ Vinyl acetate | White Soft Polymer | 77.5% | Calc. Found | 34.56 34.01 | 2.71 2.60 | 47.38 51.60 |

EXAMPLE 31

Employing the polymerization procedure described for examples 21 to 30, alternating copolymers of the novel $R_f$-monomers examples 13 through 20 and the following comonomers are prepared:

methyl vinyl ether
ethyl vinyl ether
butyl vinyl ether
4-hydroxybutyl vinyl ether
2-methoxyethyl vinyl ether
vinyl acetate
vinyl benzoate
sytrene
p-chlorostyrene
p-methoxystyrene
isobutylene

EXAMPLES 32 – 34

Polymers example 22, 25 and 27 were dissolved in hexafluoroxylene or freon 113 and polymer films prepared by placing a few drops of the polymer solutions on a glass slide and with a clean edge spreading the solution over the surface of the slide. Instantaneous solvent evaporation left the polymer as a smooth film. Contact angles of octane to tetradecane on the polymer films were measured using a Visco-Tech contact antle analyzer. From the contact angle data the critical surface tension $\gamma c$ was determined according to the following reference:

W. Zisman, Contact Angles, Advances in Chemistry, No. 43, ACS Publications, Washington, D.C., 1964. The critical surface tension data obtained with the 3 polymers are listed in Table 5.

TABLE 5

| Example No. | Polymer Ex. No. | Polymer Composition | | Molar Monomer Ratio of $R_f$-Monomer to Comonomer | $\gamma c$ (dynes/cm) |
|---|---|---|---|---|---|
| | | $R_f$-Monomer | Comonomer | | |
| 32 | 37 | $[=CHCOO(CH_2)_3S(CH_2)_2C_8F_{17}]_2$ | $CH_2=CHOCH_3$ | 1:1 | 11.5 |
| 33 | 40 | $CH_2=CCOO(CH_2)_3S(CH_2)_2C_8F_{17}$<br>$\|$<br>$CH_2COO(CH_2)_3S(CH_2)_2C_8F_{17}$ | $CH_2=CHOCH_3$ | 1:1 | 11.2 |
| 34 | 42 | $(=CHCOO(CH_2)_3S(CH_2)_2C_6F_{13})_2$ | $CH_2=CHOCH_3$ | 1:1 | 13.1 |

EXAMPLES 35 – 42

Homo- and copolymers examples 21, 22, 24, 25, 27, 28, 29, and 30 were dissolved in hexafluoroxylene so that solutions with a 2 percent solid content were obtained. These polymer solutions were further diluted with methyl chloroform and applied alone or in combination with a polymethyl methacrylate extender to a polyester fabric by padding in such a way that 0.12 percent fluorine was deposited onto the test fabric. After drying the fabric at 150°C for 3 minutes oil repellencies (AATCC and 3 M oil test) and water repellencies were determined and data obtained as listed in Table 6.

$m$ is 2 to 12,
$n$ is 3 to 12,
$R_f$ is $C_pF_{2p+1}OC_qF_{24}$

TABLE 6

| Example No. | Polymer Ex. No. | Polymer Composition | | Molar Ratio of $R_f$-Monomer to Comonomer | Repellency with 0.12% Fluorine on PE | | | |
|---|---|---|---|---|---|---|---|---|
| | | $R_f$-Monomer | Comonomer | | AATCC/3 M Oil | | AATCC Water | |
| | | | | | No Extender | Extended[1] | No Extender | Extender[1] |
| 35 | 21 | [=CHCOO(CH$_2$)$_3$S(CH$_2$)$_2$C$_8$F$_{17}$]$_2$ | CH$_2$=CHO(CH$_2$)$_4$OH | 1:1 | 6/120 | 6-7/110 | 90-100 | 90-100 |
| 36 | 22 | as above | CH$_2$=CHOCH$_3$ | 1:1 | 5-6/100 | 5/90 | 90-100 | 100 |
| 37 | 24 | CH=CCOO(CH$_2$)$_3$S(CH$_2$)$_2$C$_8$F$_{17}$ / CH$_2$COO(CH$_2$)$_3$S(CH$_2$)$_2$C$_8$F$_{17}$ | CH$_2$=CHO(CH$_2$)$_4$CH | 1:1 | 6-7/120 | 6-7/120 | 100 | 100 |
| 38 | 25 | as above | CH$_2$=CHOCH$_3$ | 1:1 | 5-6/100 | 6/100 | 90 | 100 |
| 39 | 27 | [=CHCOO(CH$_2$)$_2$S(CH$_2$)$_2$C$_6$F$_{13}$]$_2$ | CH$_2$=CHO(CH$_2$)$_4$OH | 1:1 | 5/100 | 5-6/110 | 90 | 90 |
| 40 | 28 | as above | CH$_2$=CHOCOCH$_3$ | 1:1 | 5/90 | 5/90 | 90 | 90-100 |
| 41 | 29 | as above | CH$_2$=CHC$_6$H$_5$ | 1:1 | 4/80 | 4/80 | 90 | 90-100 |
| 42 | 30 | as above | CH$_2$=CHOCH$_3$ | 1:1 | 4/80 | 4/80 | 70 | 80 |

[1] The fluoropolymers are extended with polymethyl methacrylate to a F-content of 20% in total solids.

EXAMPLES 43 – 48

Homo- and copolymers of examples 21 – 26 were dissolved as described in the previous examples and applied above or in combination with a polyisobutyl methacrylate extender to a polyester-cotton test fabric in such a way that in each case a total of 0.08 percent fluorine was deposited onto the test fabric. After drying the treated fabric at 150°C for 3 minutes, AATCC and 3 M oil repellency and AATCC water repellency ratings were determined as listed in Table 7.

$p$ is 3 to 18, and
$q$ is 2 to 8.

2. The compound of claim 1 wherein m is 2 or 3 and n is 3.
3. The compound of claim 2 wherein p is 6 to 12.
4. The compound of claim 2 wherein $C_mH_{2m}$ is linear.
5. The compound of claim 4 wherein $m$ equals $n$.
6. The compound of claim 3 wherein $m$ is 2 or 3 and $n$ is 3.
7. The compound of claim 4 wherein $n$ is 3 to 6.

TABLE 7

| Example No. | Polymer Ex. No. | Polymer Composition | | Molar Ratio of $R_f$-Monomer to Comonomer | Repellency with 0.08% fluorine on PE Cotton | | | |
|---|---|---|---|---|---|---|---|---|
| | | $R_f$-Monomer | Comonomer | | AATCC/3 M Oil | | AATCC Water | |
| | | | | | No Extender | Extended[1] | No Extender | Extended[1] |
| 43 | 21 | [=CHCOO(CH$_2$)$_3$S(CH$_2$)$_2$C$_8$F$_{17}$]$_2$ | CH$_2$=CHO(CH$_2$)$_4$ | 1:1 | 4/80 | 5/90 | 80-90 | 80 |
| 44 | 22 | as above | CH$_2$=CHOCH$_3$ | 1:1 | 4/80 | 4-5/90 | 70-80 | 70-80 |
| 45 | 23 | as above | CH$_2$=CHC$_6$H$_5$ | 1:1 | 4/80 | 5/90 | 90 | 80-90 |
| 46 | 24 | CH$_2$=CCOO(CH$_2$)$_3$S(CH$_2$)$_2$C$_8$F$_{17}$ / CH$_2$COO(CH$_2$)$_3$S(CH$_2$)$_2$C$_6$F$_{17}$ | CH$_2$=CHO(CH$_2$)$_4$CH | 1:1 | 5/90 | 5/90 | 80 | 80 |
| 47 | 25 | as above | CH$_2$=CHOCH$_3$ | 1:1 | 5/90 | 6/100 | 80 | 90 |
| 48 | 26 | as above | CH$_2$=CHC$_6$H$_5$ | 1:1 | 4/80 | 5/90 | 80-90 | 80-90 |

[1] The fluoropolymers are extended with polyisobutyl methacrylate to a F-content of 20% in total solids.

We claim:
1. A compound of the formula:
$R_fC_mH_{2m}SC_nH_{2n}OH$
wherein

8. The compound of claim 7 wherein $C_mH_{2m}$ is linear and m equals n.

UNITED STATES PATENT AND TRADEMARK OFFICE
CERTIFICATE OF CORRECTION

PATENT NO. : 3,884,879
DATED : May 20, 1975
INVENTOR(S) : Eduard Karl Kleiner

It is certified that error appears in the above-identified patent and that said Letters Patent are hereby corrected as shown below:

Claim 1, column 18, line 3, "$F_{24}$" should read -- $F_{2q}$ --.

Signed and Sealed this

*fourteenth* Day of *October 1975*

[SEAL]

Attest:

RUTH C. MASON
*Attesting Officer*

C. MARSHALL DANN
*Commissioner of Patents and Trademarks*